(12) United States Patent
Kilber et al.

(10) Patent No.: US 8,474,368 B2
(45) Date of Patent: Jul. 2, 2013

(54) MINERAL COMPOSITE BEVERAGE BREWING CUP AND CARTRIDGE

(75) Inventors: Stephen Mark Kilber, Oshkosh, WI (US); Sam Edward Wuest, Oshkosh, WI (US); Michael Holmes Melbye, Neenah, WI (US)

(73) Assignee: Curwood, Inc., Oshkosh, WI (US)

( * ) Notice: Subject to any disclaimer, the term of this patent is extended or adjusted under 35 U.S.C. 154(b) by 789 days.

(21) Appl. No.: 12/465,199

(22) Filed: May 13, 2009

(65) Prior Publication Data

US 2010/0288131 A1    Nov. 18, 2010

(51) Int. Cl.
*A47J 31/06* (2006.01)

(52) U.S. Cl.
USPC ............................................ 99/295; 426/77

(58) Field of Classification Search
USPC ............... 99/295, 278, 275; 426/77; 210/474; 264/510; 220/200
See application file for complete search history.

(56) References Cited

U.S. PATENT DOCUMENTS

| | | | | |
|---|---|---|---|---|
| 3,833,740 A | * | 9/1974 | Schmidt | 426/80 |
| 4,101,050 A | * | 7/1978 | Buckler et al. | 428/35.7 |
| 4,136,202 A | * | 1/1979 | Favre | 426/77 |
| 4,875,620 A | * | 10/1989 | Lane, Sr. | 229/404 |
| 5,314,969 A | * | 5/1994 | Imaizumi et al. | 523/102 |
| 5,325,765 A | | 7/1994 | Sylvan et al. | |
| 5,637,335 A | | 6/1997 | Fond et al. | |
| 5,840,189 A | * | 11/1998 | Sylvan et al. | 210/474 |
| 5,948,455 A | * | 9/1999 | Schaeffer et al. | 426/77 |
| 6,142,063 A | | 11/2000 | Beaulieu et al. | |
| 6,511,688 B2 | | 1/2003 | Edwards et al. | |
| 6,528,144 B2 | * | 3/2003 | Peiffer et al. | 428/141 |
| 6,607,762 B2 | | 8/2003 | Lazaris et al. | |
| 6,645,537 B2 | | 11/2003 | Sweeney et al. | |
| 6,698,333 B2 | | 3/2004 | Halliday et al. | |
| 6,708,600 B2 | | 3/2004 | Winkler et al. | |
| 6,740,345 B2 | | 5/2004 | Cai | |

(Continued)

FOREIGN PATENT DOCUMENTS

| | | |
|---|---|---|
| EP | 272922 A3 | 6/1988 |
| EP | 179641 B1 | 1/1990 |

(Continued)

OTHER PUBLICATIONS

Effect of Calcium Carbonate Properties on Reinforcement of HMW-HDPE Films, Heritage Plastics, 1999, http://www.heritage-plastics.com/en/pdfs/effect_CoC3.pdf, 5 pages.*

(Continued)

*Primary Examiner* — Gene Kim
*Assistant Examiner* — M Chambers
(74) *Attorney, Agent, or Firm* — Tom J. Hall

(57) ABSTRACT

A beverage filter cartridge having a cup, a filter, a lid and at least one beverage ingredient is provided where the cup and lid are sealed together to form an interior chamber which is separated into a first and second compartments by the filter, which is preferably basket or cone shaped, and a beverage ingredient such as coffee is contained inside first compartment, and at least one of the cup, lid and filter contains calcium carbonate in an amount effective to either improve the ability of beverage makers to pierce the cup or to provide a means for the cartridge to absorb $CO_2$ emitted by the ingredient thereby reducing the hold time to packing and reducing the number of defective cartridges.

28 Claims, 3 Drawing Sheets

U.S. PATENT DOCUMENTS

| | | | |
|---|---|---|---|
| 6,793,994 B2 * | 9/2004 | Tsai et al. .................... | 428/35.7 |
| 6,863,964 B2 * | 3/2005 | Migliorini et al. ............ | 428/213 |
| 7,081,263 B2 * | 7/2006 | Albrecht ......................... | 426/82 |
| 7,318,372 B2 | 1/2008 | Cooke | |
| 7,418,899 B2 | 9/2008 | Halliday et al. | |
| 7,427,430 B2 * | 9/2008 | Rhee et al. .................... | 428/35.7 |
| 2005/0261426 A1 * | 11/2005 | Wood et al. ..................... | 525/66 |
| 2008/0251446 A1 * | 10/2008 | Vangedal-Nielsen et al. .......................... | 210/500.4 |

FOREIGN PATENT DOCUMENTS

| | | | |
|---|---|---|---|
| EP | 468079 A1 | 1/1992 | |
| EP | 512468 A1 | 11/1992 | |
| EP | 821906 A1 | 2/1998 | |
| WO | 9401344 A1 | 1/1994 | |
| WO | 219875 A1 | 3/2002 | |

OTHER PUBLICATIONS

PlasticsTechnology, Jan Schut, Dec. 2006, www.ptonline.com/articles/more-filler-less-resin-bag-films-load-up-to-cut-costs, 5 pages.*

NSSGA: Communications-Calcium Carbonate, 2012, www.nssga.org/communications/calcarbro.cfm, 2 pages.*

Specialty Minerals:Calcium Carbonate, 2012,www.specialtyminerals.com/specialty-applications/specialty-markets-for-minerals/plastics/gcc-in-plastics/, 1 page.*

Webpage download, K60, 2012, http://www.gemaelectroplasticsuk.co.uk/products/gemastiren-k60.html, 1 page.*

Webpage download, HeritagePlastics, 2007, web.archive.org/web/20070812025931/http://www.heritage-plastics.com/polymax.htm, 9 pages.*

Webpage download, HeritagePlastics-WhitePapers, 2008, web.archive.org/web/20080821150325/http://www.heritage-plastics.com/pdfs/effect_coc3.htm, 23 pages.*

Webpage download, PlasticsTechnology, 2005, web.archive.org/web/20070812025931/http://www.heritage-plastics.com/polymax.htm, 7 pages.*

Webpage download, Brueckner, 2006, www.brueckner.com/fileadmin/user_upload/downloads/TZ_17_new.pdf, 36 pages.*

Heritage Plastics, Hical™ & HM10™ Calcium Carbonate Concentrates for Injection Molding Application Guide, retrieved Feb. 24. 2009, online at www.heritage-plastics.com/applications.htm.

Heritage Plastics, HM10™ Calcium Carbonate Concentrates for Polyolefin Extrusion Film, Sheet, Thermoforming Application Guide, retrieved Feb. 24. 2009, online at www.heritage-plastics.com/applications.htm.

Heritage Plastics, "More Filler, Less Resin: Bag Films Load Up to Cut Costs". retrieved Feb. 24 2009, online at www.heritage-plastics com/newsroom.htm.

Heritage Plastics, PolyCal EC Calcium Carbonate Concentrates for Extrusion Coating Application Guide. retrieved Feb. 24, 2009, online at www.heritage-plastics.com/applications.htm.

Heritage Plastics, PolyMax™ Calcium Carbonate Concentrates for Blow Molding Application Guide, retrieved Feb. 24, 2009, online at www.heritage-plastics.com/applications.htm.

Heritage Plastics, StyroCal™ Calcium Carbonate Concentrates for Polystyrene Application Guide, retrieved Feb. 24, 2009, online at www.heritage-plastics.com/applications.htm.

* cited by examiner

MINERAL COMPOSITE BEVERAGE BREWING CUP AND CARTRIDGE

TECHNICAL FIELD

The present disclosure relates to improvements in the art of disposable beverage brewing containers such as disposable single serve beverage filter cartridges.

BACKGROUND

Beverage making systems are known where a predetermined amount of a beverage making ingredient, such as ground, freeze dried, or instant coffee, is held in a container or capsule, with or without filtration means, and then placed into a beverage making apparatus. The apparatus then introduces water into the container, where it dissolves, extracts, emulsifies, or dilutes the ingredient(s) to form a beverage. In a typical example, heated water is injected into a container having ground roast coffee in a filter cartridge which infuses the water to form brewed coffee. The beverage exits the container chamber e.g. by flowing through an opening or perforation in the container.

Various beverage making systems and containers therefor are shown in U.S. Pat. No. 5,325,765 (Sylvan et al); U.S. Pat. No. 5,840,189 (Sylvan et al); U.S. Pat. No. 6,142,063 (Beaulieu et al); U.S. Pat. No. 7,318,372 (Cooke); U.S. Pat. No. 6,698,333 (Halliday et al); U.S. Pat. No. 7,418,899 (Halliday et al); and EP-A-0821906 (Sara Lee), EP-A-0512468 (Nestle), EP-A-0468079 (Nestle), WO 94/01344 (Nestle), EP-A-0272922 (Kenco), and EP-A-0179641 (Mars) and WO 02/19875 (Mars), the entire contents of all of which are hereby incorporated herein by reference.

Disposable chambered articles or containers (sometimes referred to as cups or capsules) are used in beverage making systems for steeping, infusing, brewing, diluting, emulsifying, extracting or otherwise contacting liquids such as water with organic material such as coffee to impart flavor, aroma, nutrients or other physiologically active agents are known. These liquids may be hot, cold or ambient temperatures. For example, beverage making systems and filter cartridges such as the Keurig™ cup disposable single serve beverage filter cartridge (commercially available from Keurig, Incorporated, Wakefield, Mass., USA and described and disclosed in incorporated U.S. Pat. Nos. 5,325,765 and 5,840,189 (Sylvan et al)) provide a convenient method to make a cup of a brewed hot beverage and provide a means to offer a wide selection of e.g. coffees and cocoa drinks. A variety of such containers and cartridges are used in beverage brewing machines such as those described above. Beverage cartridges are typically made of a filter element held inside a pierceable base and/or lid. These beverage making systems and containers such as the Keurig cup have been commercially successful however certain disadvantages have led to various attempts for improvements.

Beverage filter cartridges like the Keurig cup comprise a yieldably pierceable cup-shaped container which is otherwise impermeable to water and atmospheric oxygen. These containers may be made by thermoforming sheet or injection molding monolayer or multilayer polymeric resins to form relatively rigid plastic containers or capsules. A container may be internally divided into a plurality of chambers e.g. by filter means such as cone-shaped paper filter into first and second chambers. A dry beverage making ingredient, e.g., roasted ground coffee, is separated from the second chamber by storage in the first chamber, and the container is closed by a yieldably pierceable lid comprising e.g. a laminate of metallic foil and heat sealable plastic. This lid is also otherwise impermeable to water and atmospheric oxygen.

During beverage making, the lid and container bottom are pierced from opposite directions, by tubular inlet and outlet tubes, respectively. The inlet tube introduces heated liquid into the first chamber for infusion with the beverage ingredient(s), and the resulting brewed beverage passes through the filter into a second chamber from which it exits through the outlet tube and into a drinking cup.

The beverage filter cartridges made in accordance with the foregoing Keurig patents have been commercially successful, notwithstanding certain problems and disadvantages relating to their use that have persisted since their introduction.

For example, the base of the container is thick, compared to the lid, with a resultant higher resistance to piercing. Furthermore due to the nature of the thermoforming process the container base is made from a sheet having a relatively uniform thickness and the thermoformed base bottom cannot easily be thinned without also thinning the base sidewall which adversely reduces the rigidity and strength of the base causing a tendency for the sidewall to buckle inward during the piercing process. Also, as the outlet tube is pressed against the base bottom for piercing to permit exit of brewed coffee, a similar buckling may occur. These distortions of the container disadvantageously can result in leakage proximate the outlet tube causing the liquid to spray or coat parts of the apparatus or otherwise remain or locate to undesirable places rather than travel along the desired path to the inside of the drinking cup. This leakage may produce customer dissatisfaction due to loss of product, as well as require additional maintenance to avoid unsanitary conditions or further equipment malfunction.

To ameliorate the difficulty in piercing the base, beverage makers have been equipped with wear resistant, metal outlet tubes that can be sharpened as needed to effectively pierce the container bottoms. These tubes are expensive and may require periodic sharpening.

Another problem associated with distortion of the base by the piercing operation is that some brewed beverage may remain in the second chamber unable to exit due to the distortion proximate the outlet tube pierced opening causing an area within the base to be below the outlet tube opening.

One attempt to address problems associated with piercing the container bottom has been to redesign the container and relocate the outlet tube so that it travels parallel to the inlet tube and also pierces the top of the container which is typically made of thinner lid stock film. This attempt to resolve the problem is further described in U.S. Pat. No. 6,607,762 (Lazaris et al) which is assigned to Keurig. This attempt suffers from the need to provide not only different containers or cartridges, but also a different beverage making apparatus since the outlet tubes must be introduced from a position that is located 180° from the present apparatus location. Thus existing beverage brewers would need to be replaced. Also, there are additional complications attendant to the brewing process since the distribution of ingredient and flow of the liquid are not as easily controlled to yield a uniform extraction from e.g. ground coffee. It is believed that this system while addressing the piercing problem would tend to produce a channelling effect in transfer of the hot water across the coffee resulting in a need for containers made from more material, or which use additional coffee or a longer residence time to produce an equivalent amount of brewed coffee. Additionally the exit tube would require a motive force in opposition to gravity to cause the brewed liquid to exit which is believed to lead to additional expense to create a positive or negative pressure sufficient to effect transport or alternatively necessitates use of additional water to displace the requisite amount of brewed coffee thereby creating a waste of water and additional disposal concerns and weight.

As previously mentioned the container base needs to have sufficient rigidity to avoid buckling induced leaking caused by a puncturing operation during which the outlet tube is inserted. This tendency of the container side wall to buckle under the force exerted by the outlet tube as it pierces or attempts to pierce the container bottom sometimes results in a failure of the outlet tube to achieve the desired penetration, thereby causing a malfunction in the brewing process which prevents delivery of some or all of the brewed beverage to the underlying drinking cup. As previously mentioned, buckling of the container side wall can also distort the punctured opening in the container bottom, thereby disrupting a continuous seal about the tube perimeter which may result in leakage of the brewed beverage.

Other known problems include reliably sealing the flange or rim of the filter component to the interior side wall of the container, as well as in centrally securing the bottom of the filter component to the container bottom. Failure to achieve a proper flange seal can cause the unsealed portion of the filter to collapse under pressure from introduction of the liquid, resulting in the brewed beverage being contaminated by beverage ingredient particles such as coffee grounds from the collapsed filter. Contamination of the beverage may also happen if the filter bottom is not properly located and secured, resulting in the filter being punctured by the outlet probe as it projects upwardly through the container bottom. Contamination also may occur by bursting of a filter element due to the pressure from the heated liquid being infused with the beverage ingredient(s).

Another problem arises from heat sealing the upper rim of the filter at or closely adjacent to the upper rim of the container side wall. This increases the unoccupied head space between the outside of the filter and the surrounding container wall, and also limits the maximum amount of beverage medium that can be stored in the cartridge to that which can be contained within the filter. In some cases, this can compromise the "strength" or extent of extraction of a resulting brewed beverage. Beverage strength can be increased by filling the filter to its maximum capacity, but this can result in errant granules of the beverage medium spilling onto the container rim. This in turn can disrupt the integrity of the seal between the cover and the container rim.

Thus, there needs to be sufficient rigidity to hold and brew the coffee without bursting the container or causing leaking and sufficient rigidity and flexibility to provide a good alignment between the filter and lid stock at the base top flange and good alignment with the inlet and outlet tube perimeters sufficient to permit the flow into and out of the container without undesirable leakage of either liquid or particles such as coffee grounds into the drink. One approach to provide a material that is more easily pierced is to thin the wall of the container however this tends to undesirably decrease rigidity of the container and increase flexibility. To counteract increased flexibility and increase desirable rigidity another approach has been to reconfigure the geometry of the container such as described in U.S. Pat. No. 6,645,537 (Sweeney et al) assigned to Keurig. The Sweeney patent attempts to improve strength and rigidity by providing a fluted geometry. Such fluting may also introduce manufacturing complications by causing thinning of the barrier layers and materials within the container walls which assist the container in preventing or diminishing the permeability thereof to gases such as oxygen which have a deleterious effect on ingredients. In addition, production of fluted containers may reduce production speeds.

Thus, there are several known drawbacks including difficulties associated with piercing or puncturing the container base, lack of rigidity or excessive flexibility in the base and the amount of packaging material required to produce a functional container. There is a desire to provide a container which may easily be pierced by hollow tubes to permit entrance and/or egress of liquids to and from the container during the beverage making process.

There is a continuing need for an improved beverage container including improved filter cartridges that lessen the above-noted problems and disadvantages.

Among the objectives of the present invention it is desirable to minimize material consumption for not only economic reasons, but also for conservation of resources, and to minimize the amount of material to be disposed into landfills or by other means. A container composition that reduces the amount of material required for a functional container would provide a benefit to the product. Containers such as a Keurig cup or cartridge require tight size tolerances with a small range of variation to maintain acceptable levels of performance and these tight tolerances lead to waste in thermoforming operations.

Another object of the present invention is a strengthening of the container side wall to thereby resist buckling when the container bottom is punctured by the outlet tube of the brewer.

Another object of the present invention is to provide a cup which is easy to puncture through the base without deleteriously affecting other properties A further object of the present invention is to strengthen the container side wall to resist buckling when the container bottom is punctured by the outlet tube of the brewer.

These and other advantages of the invention will be apparent from the description below. It is not necessary that all embodiments of the invention meet all of the objects. It is sufficient that the invention may advantageously be employed. the above advantages singly or in various combinations may be beneficially achieved in various embodiments of the invention.

BRIEF SUMMARY

Accordingly, the present invention provides an improved container which may be used as a single use processing cup for brewing beverages. The inventive container base or cup may be formed by molding from a unitary multilayer polymeric sheet containing calcium carbonate to form a unitary molded multilayer cup with a continuous sidewall portion integral with a bottom portion. The bottom portion in conjunction with a top opening defined by a continuous perimeter flange integral with an upper edge portion of the continuous sidewall and located distally from said bottom portion forms a cup having an interior surface layer, an exterior surface layer and at least one intermediate layer.

The inventive cup may be used with lid stock either alone or in combination with a filter to form a cartridge or filter cartridge containing one or more beverage ingredients. The cup and lid is typically made from materials which are substantially air- and water-impermeable, that is to say that these materials are not apertured e.g. by perforations or cavitated holes, yet these materials are designed to permit puncture or piercing by a tube to allow introduction and removal of a liquid, typically hot water being introduced and a brewed beverage drink such as coffee being removed to a drinking cup for consumption by a consumer. In this manner the invention serves the function of preventing undesirable transmisson of moisture or oxygen prior to use in a brewing process, yet permits easy puncture for admissiom of hot water for brewing to accomplish the dual and sympathetic goals of retaining freshness prior to brewing and producing a flavorful brewed beverage. Air or oxygen "impermeable" means the cup or container has an oxygen transmission rate ($O_2$TR) of less than 0.1 $cm^3$/cup (or container) for a 24 hour period at 1 atmosphere, 50% relative humidity, and 23° C. Preferably the cup and/or container will have an $O_2$TR of less than 0.5 $cm^3$/cup (or container) for a 24 hour period at 1 atmosphere, 50% relative humidity, and 23° C.

In another embodiment, a multilayer sheet or film comprising a beverage contact layer contains calcium carbonate in either or both of the container base and/or lid to act as a carbon dioxide scavenger. This layer may also optionally be heat sealable. The container base and/or lid may have an oxygen gas transmission rate of less than about 70 $cm^3/m^2$ for a 24 hour period at 1 atmosphere, 0% relative humidity, and 23° C.

The container is suitable for use in beverage making machines such as those designed for brewing single cups of coffee, hot chocolate, tea and the like.

DETAILED DESCRIPTION

Figure 1:
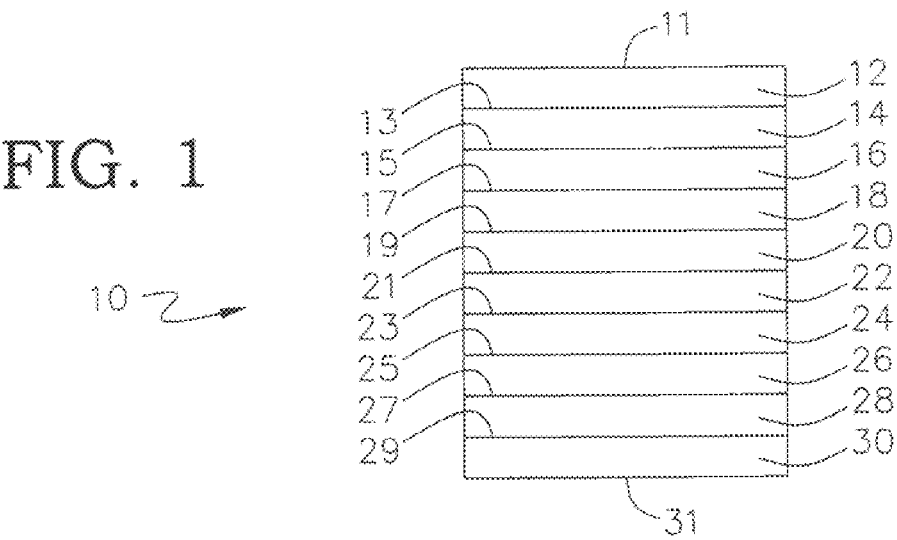
FIG. 1 illustrates a schematic view of a sheet suitable for making a cup according to the present invention.

The inventive sheet, cup, container, and cartridge of the present invention may be used to package, transport, and/or process a variety of materials including foods and beverage ingredients. The present invention is particularly well adapted for use in hot beverage brewing machines of the type utilized to dispense single servings of coffee, hot chocolate or other hot drinks.

It has been discovered that addition of calcium carbonate ($CaCO_3$) to the material used to make container bases and/or lids for single serve beverage cartridges solves or greatly reduces several problems associated with prior art container bases, lids and cartridges. Benefits of the invention in its various embodiments include one or more of the following: resolving puncture problems by facilitation of container bottom piercing with reduced leakage, improved rigidity of sidewalls, improved compressive strength, reduction in cost of materials, reduction in use of polymers made from nonrenewable resources, lower production waste, increased carbon dioxide absorption, reduction in time to packing, reduction in time of exposure to oxidative degradation of beverage ingredients such as ground roast coffee, reduced maintenance of beverage apparatus, improved sanitation.

According to the present invention a polymeric thermoformed or injection molded container may be provided which may be used in conjunction with lid films and/or foils (often termed lid stock or lidding) to form a container or cartridge. In use a beverage cartridge must provide inlet means for the introduction of an aqueous medium into the cartridge, and outlet means for a beverage produced from one or more beverage ingredients. These inlet and outlet means may be accomplished by construction of the cartridge container base and lid of materials in a manner whereby the base and/or lid wall may be pierced by a plurality of hollow tubes through which liquids may enter and/or exit the cartridge.

It will be understood that by the term "cartridge" as used herein is meant any package, container, or receptacle which contains one or more beverage ingredients in the manner described. The cartridge may be made from a combination of components including rigid, semi-rigid or flexible materials. A filter cartridge includes filter means to separate the interior of the container into at least two chambers where a majority of an ingredient constituent such as insoluble coffee grounds are kept separate from at least one chamber. The cartridge of the present invention contains one or more beverage ingredients suitable for the formation of a beverage product. The beverage product may be, for example, one of coffee, tea, chocolate or a dairy-based beverage including milk. The beverage ingredients may be powdered, ground, leaf-based or liquid. The beverage ingredients may be insoluble or soluble. Examples include roast and ground coffee, leaf tea, powdered chocolate and soup, liquid milk-based beverages, carbonated drink syrups and concentrated fruit juices. A typical beverage apparatus is adapted to brew beverages from a container or capsule containing a beverage brewing ingredient, such as ground coffee or leaf tea.

For the purposes of promoting an understanding of the principles of the invention, a general description of a beverage making system ensues followed by reference to the embodiments illustrated in the drawings.

As used herein, terms such as "preferably," "desirably," "common," and "typical" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

In a common type of beverage making system such as that commercialized by Keurig, Incorporated of Waltham, Mass., USA, a cartridge is provided which comprises a container base and lid sealed together with a filter element separating the container interior chamber into two compartments with the upper compartment containing a beverage ingredient such as flavored or unflavored ground roast coffee, leaf tea, hot chocolate drink mix, etc. To obtain a beverage a cartridge having the desired beverage ingredient(s) is selected and inserted into a cartridge receiving portion of a beverage making apparatus, a drinking cup is placed into the drink receiving area and a push button is depressed to initiate the brewing or beverage making process as is well known in the art. In operation the cartridge top or lid is punctured to introduce hot water into the top of the container which under the influence of pressure and/or gravity then passes through the container and exits through one or more openings made by piercing the bottom of the container. As the water traverses the container desirable components are extracted or dissolved from ground roast coffee (or other materials) and carried along with the water forming a beverage. The fluidic communication to and from the cartridge chamber is facilitate by inlet and outlet piercing tubes through which liquid may respectively enter and exit the container.

Referring now to FIG. 1, a schematic representation is shown of a preferred multilayer sheet 10 from which a container base (see FIG. 3) may be manufactured e.g. by well known means in the art such as thermoforming. FIG. 1 is referenced to demonstrate the relative positions of various layers of the sheet structure which is not to scale and the individual layer thicknesses will vary in practice in accordance with the functionality desired for the various layers and depending upon the equipment chosen to make the sheet. Sheet 10 has a first surface 11 which will become the interior surface of a container base or cup. Surface 11 is one side of first layer 12 which may serve one or more of the following functions. First layer 12 will come into contact with a liquid material to be conveyed through the container and also contact any dissolved or extracted ingredients such as hot water and brewed coffee, respectively. Opposite to the first surface 11 is a first interface 13 where second layer 14 is connected to layer 12 e.g. by fusion or other bonding means as described further below. In like manner, second layer 14 is bonded through second interface 15 to third layer 16 which is bonded through third interface 17 to fourth layer 18, and so on with fourth interface 19, fifth layer 20, fifth interface 21, sixth layer 22, sixth interface 23, seventh layer 24, seventh interface 25, eight layer 26, eighth interface 27, ninth layer 28, ninth interface 29, and tenth layer 30. Tenth layer 30 has a second surface 31 located distally on the opposite side of the sheet 10 from the first surface 11.

As previously mentioned first layer 12 will necessarily come into contact with at least one component of a material to be contained with the container 10. Advantageously layer 12 may also be heat sealable to permit easy bonding to a lid or filter means as further described below. First layer 12 may optionally also have incorporated therein or on its surface calcium carbonate in an amount sufficient to scavenge carbon dioxide gas emitted from ingredients held within container 10. During the process of packaging e.g. ground coffee, it is highly desirable to roast, grind and package the ground coffee as soon as is feasible to avoid oxidative deterioration of the organoleptic qualities of the coffee. However it is known that the roasting process causes coffee to emit carbon dioxide for a period of time. This is why many whole bean roast coffee packages contain one way valves to permit escape of the emitted carbon dioxide. These valves allow the coffee to be packed closer in time to roasting thereby improving product quality and lessening oxidative deterioration that would occur. For single serve coffee processing cartridges the roasted coffee must be held for hours to gas off prior to packaging because these packages are too small to accommodate economical one way valves. If the coffee is packaged too soon the sealed package would undesirably pressurize which could lead to cartridge distortion and cracking. Distortion of the cartridge may interfere with proper operation in the beverage brewing apparatus and cracking may destroy the integrity of the package leading to product quality deterioration, spoilage, rejects and consumer dissatisfaction. Typical hold times for packaging coffee into small single serve cartridges can range from 12 to 72 hours depending upon ingredients and processing. Use of calcium carbonate may reduce hold times and/or provide a degree of additional protection against formation of such defects with or without a reduction in hold time.

The first layer 12 of the sheet may typically comprise at least one material independently selected from the following: polyethylenes, polypropylenes, ethylene/α-olefin copolymers having at least one $C_3$ to $C_{10}$ α-olefin, propylene/ethylene copolymers, ethylene/vinyl acetate copolymers, polystyrene homopolymers and styrenic copolymers e.g. styrene-butadiene copolymer, polyamides, polyesters, polyvinyl chlorides, ionomers, and mixtures thereof.

Polyethylene is the name for a polymer whose basic structure is characterized by the chain —($CH_2$—$CH_2$)—. Polyethylene homopolymer is generally described as being a solid which has a partially amorphous phase and partially crystalline phase with a density of between 0.915 to 0.970 g/cm$^3$. The relative crystallinity of polyethylene is known to affect its physical properties. The amorphous phase imparts flexibility and high impact strength while the crystalline phase imparts a high softening temperature and rigidity.

People skilled in the art generally refer to several broad categories of polymers and copolymers as "polyethylene." Placement of a particular polymer into one of these categories of "polyethylene" is frequently based upon the density of the "polyethylene" and often by additional reference to the process by which it was made since the process often determines the degree of branching, crystallinity and density. In general, the nomenclature used is nonspecific to a compound but refers instead to a range of compositions. This range often includes both homopolymers and copolymers.

Hereinafter, the term "polyethylene" will be used (unless indicated otherwise) to refer to ethylene homopolymers as well as copolymers of ethylene with alpha-olefins and the term will be used without regard to the presence or absence of substituent branch groups.

"High density" polyethylene (HDPE) is ordinarily used in the art to refer to both (a) homopolymers of densities between about 0.960 to 0.970 g/cm$^3$ and (b) copolymers of ethylene and an alpha-olefin (usually 1-butene or 1-hexene) which have densities between 0.940 and 0.958 g/cm$^3$. HDPE includes polymers made with Ziegler or Phillips type catalysts and is also said to include high molecular weight "polyethylenes."

Another broad group of polyethylene is "high pressure, low density polyethylene" (LDPE). LDPE is used to denominate branched homopolymers having densities between 0.915 and 0.930 g/cm$^3$ as well as copolymers containing polar groups resulting from copolymerization e.g. with vinyl acetate or ethyl acrylate. LDPEs typically contain long branches off the main chain (often termed "backbone") with alkyl substituents of 2 to 8 carbon atoms.

Another group of polyethylene is Linear Low Density Polyethylene (LLDPE). Only copolymers of ethylene with alpha-olefins are in this group, LLDPEs are presently recognized by those skilled in the art as having densities from 0.915 to 0.940 g/cm$^3$. The alpha-olefin utilized is usually 1-butene, 1-hexene, or 1-octene and Ziegler-type catalysts are usually employed (although Phillips catalysts are also used to produce LLDPE having densities at the higher end of the range).

Another group of polyethylene is Very Low Density Polyethylene (VLDPE) which is also called "Ultra Low Density Polyethylene" (LLDPE). This group like LLDPEs comprise only copolymers of ethylene with alpha-olefins, usually 1-butene, 1-hexene or 1-octene and are recognized by those skilled in the art as having a high degree of linearity of structure with short branching rather than the long side branches characteristic of LDPE. However, VLDPEs have lower densities than LLDPEs. The densities of VLDPEs are recognized by those skilled in the art to range below 0.915 g/cm$^3$.

In preferred embodiments of the invention designed for use with food or drink, the materials will be approved for food contact and will not deleteriously affect food or drink quality or safety. The polyethylene family of polymers include such polymers as (LLDPE), VLDPE, HDPE, LDPE, ethylene vinyl ester copolymer or ethylene alkyl acrylate copolymer.

Second layer 14 and sixth layer 22 are intermediate layers and may also comprise any of the above polymers mentioned above with respect to the first layer 12. These layers may supply structural integrity to a multilayer structure to facilitate film formation e.g. by blown film processes. They may also contribute to formation of a good thermal seals and assist in fusion bonding.

The third layer 16 and fifth layer 20 may each be an adhesive layer which is used to provide a good delamination resistant bond between the second layer 14 and the fourth layer 18, and the fourth layer and the sixth layer, respectively. In various multilayer embodiments well known adhesive resins such as maleic anhydride modified EVAs or polyethylenes, or acrylic acid or methacrylic acid copolymers e.g. with ethylene may be used in addition to or in place of various polymers indicated above with respect to other layers including in intermediate or outer layers to adhere to adjacent layers. Use of such adhesives may be advantageous e.g. to bond polymers such as ethylene vinyl alcohol copolymer (EVOH) to ethylene polymer containing layers such as LDPE.

The fourth layer is exemplary of an oxygen barrier layer. In another aspect of the invention, one or more gas barrier layers may be incorporated into a multilayer sheet or film as either an intermediate or surface layer or both. For example, ethylene vinyl alcohol copolymer (EVOH), vinylidene chloride-methylacrylate copolymer, nylon such as nylon 6 or amorphous nylon, polyvinylidene chloride-vinyl chloride copolymer (PVDC), polyglycolic acid polymers, acrylonitriles and other materials having oxygen barrier properties may be used in one or more layers such as the fourth layer 18. Blends of gas barrier resins may also be used e.g. a blend of nylon with EVOH. Typical gas barrier films will have an $O_2$ transmission rate of less than 15 $cm^3$/100 $in^2$ for 24 hours (hrs.) at 1 atmosphere (atm.).

The eighth and tenth layers are intermediate layers which may comprise any of the materials listed above. In one embodiment of the invention these layers comprise a styrenic homopolymer or copolymer such as styrene-butadiene copolymer. Preferred polymers for these layers are high impact polystyrene (HIPS) and crystalline polystyrene and blends thereof. These layers add deep drawability and ease of thermoforming or molding functionality to the structure and also provide excellent heat stability and resistance to deformation by heat in use. For example, use of the inventive cup in contact with hot water at the temperatures produced by brewing machines require that the cups and containers maintain integrity and structural strength. Polystyrene, high impact polystyrene and styrene butadiene copolymers provide such stability. Polypropylene homopolymers and copolymers also have heat stability and good thermoformability and are contemplated as preferred substitutes or alternatives for applications involving elevated temperatures during end use. A disadvantage of polypropylene polymers is their resistance to puncture in those applications where an easy to puncture portion e.g. bottom, top, or side wall is desired.

The ninth layer is an intermediate layer which beneficially may be used to recycle trim and other polymeric materials to reduce waste. Intermediate layers may also advantageously maintain or assist in providing desired structural support and other desired physical properties. The eighth and tenth layers may also serve to facilitate processing and/or provide dimesional stability. In an alternative embodiment, the functionality of layers 8-10 may be provided in a single layer or in 2, 3, 4 or more layers.

According to the present invention calcium carbonate is added to at least one layer of the multilayer structure to impart improved properties to the container formed thereby. In one preferred embodiment $CaCO_3$ is added to the ninth layer. Preferably the $CaCO_3$ is present in an amount of at least 5 weight percent based upon the total weight of the structure. Suitable amounts of $CaCO_3$ in the structure may range from 3.5 to 40 or more. Amounts less than 3% may be insufficient to achieve the desired results, while amounts higher than 50% may not provide any further improvement in properties. Preferably the $CaCO_3$ will be in an amount of between about 10 and 30%. Suitable $CaCO_3$ may be introduced to the layers containing styrenic polymer through the use of a calcium carbonate concentrate for polystyrene that is commercially available from Heritage Plastics of Picayune, Miss., USA under the trademark StyroCal™. Alternatively the Calcium carbonate may be incorporated into other layers instead of or in addition to the styrenic layer or layers. Other concentrates of $CaCO_3$ in various carrier resins such as HDPE, LLDPE, and PP are also commercially available e.g. from Heritage Plastics.

Calcium carbonate has been known to be added to flexible polymeric films for the purpose of cavitation by stretching to produce films of increased porosity. In the present invention it is preferred to maintain high barriers to both moisture and oxygen permeability across the cup, and container walls. Thus, noncavitated structures are preferred and even necessary for certain highly desirable applications of the invention such as production of brewing cartridges and components therefor for containing oxygen sensitive materials that degrade organoleptically in the presence of oxygen. In this manner in the preferred impermeable structures of the present invention oxygen and moisture sensitive contents such as coffee are preserved in a fresh state.

Any of the surface or intermediate layers may be formed of alternative thermoplastic materials, for example, polyamides, styrenic polymers or copolymers e.g. styrene-butadiene copolymer, polypropylenes, ethylene-propylene copolymers, ionomers, or alpha-olefin polymers and members of the polyethylene family such as (LLDPE), VLDPE, HDPE, LDPE, ethylene vinyl ester copolymer or ethylene alkyl acrylate copolymer or various blends of two or more of these materials.

Figure 2:
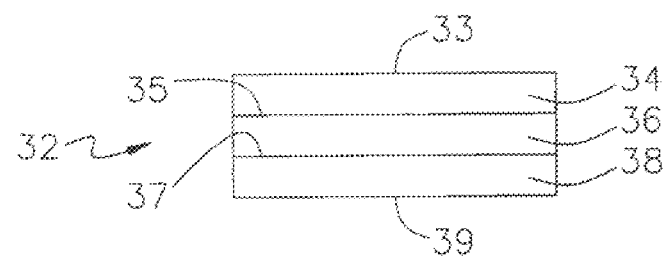
FIG. 2 illustrates a schematic view of lid stock.

Referring now to FIG. 2, a schematic representation is shown of a preferred multilayer lidding stock 32 from which a container lid (see FIG. 4) may be manufactured e.g. by well known means in the art such as the blown film, foil making and lamination processes. FIG. 2 is referenced to demonstrate the relative positions of various layers of the lid stock structure which is not to scale and the individual layer thicknesses will vary in practice in accordance with the functionality desired for the various layers and depending upon the equipment chosen to make the lid stock. Lid 32 has a first surface 33 which will become the interior surface of a container lid or top. Surface 33 is one side of first lid layer 34 which may serve one or more of the following functions. First lid layer 34 will come into contact with a liquid material to be conveyed through the container such as hot water and will also contact other ingredients held in a top chamber such as coffee. Opposite to the first lid surface 33 is a first interface 35 where second lid layer 36 is connected to first lid layer 34 e.g. by adhesive or other bonding means as described further below. In like manner, second lid layer 36 is bonded through second interface 37 to third lid layer 38. Third lid layer 38 has a second lid surface 39 located distally on the opposite side of the lid stock 32 from the first surface 33.

A suitable lid stock may comprise an oxygen barrier material in combination with a material capable of being sealed to the container base. For example lid layer 34 may comprise a metal foil such as aluminum foil which is connected via adhesive lamination to a heat sealable polyethylene layer 38 by adhesive layer 36. Alternatively, extrusion lamination may also be employed. The adhesive layer may be an isocyanate adhesive that cures to form a polyurethane. Such a structure may provide a printable surface 33, have an excellent oxygen barrier due to use of the metal foil and form a string heat seal due to the use of a polyethylene which also provides water vapor barrier properties. Alternatively metallized or nonmetallized films, preferably metallized non-cellulosic polymer films e.g. metallized polypropylene or polyester terephthalate (PET) may be employed where a metallic coating such as an aluminum or a nonmetallic coating of e.g. a silicon based material is deposited by means known in the art on the surface of film 38 to provide a two layer structure to which othe rlater smay be added. Alternatively a three, four, five or more layer film may be made using known polymeric oxygen barrier materials such as EVOH or saran. All of these structures may be made sufficiently thin and of materials suitable to facilitate easy piercing on the lid without undesirable leaking. The top of the container does not need to support the weight of the ingredients and liquid under the beverage making process conditions.

Advantageously, according to the present invention the lid layer 38 which has surface 39 adjacent to the contents of the container may further comprise calcium carbonate for the purpose of scavenging, adsorbing or absorbing carbon dioxide and/or moisture. This will function in the same manner as $CaCO_3$ incorporated into the surface of the base and may co-operate therewith to increase the amount of $CaCO_3$ available to serve the moisture and gas removal function thereby improving the quality of the products and having the other advantages described above with respect to the base.

Figure 3:
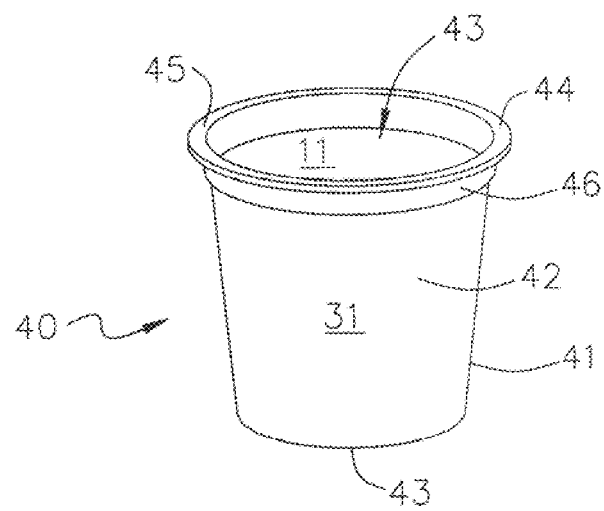
FIG. 3 illustrates a perspective view of a cup.

Referring now to FIG. 3, sheet 10 may be molded by injection molding or thermoformed into a container or cup 40 (or alternatively cup 40 may be made with the same materials using injection molding technology) having the sheet's first surface 11 and second surface 31 forming the cup's interior and exterior surfaces, respectively. Cup 40 comprises a thermoformed body 41 having a tapered side wall 42 defining an interior chamber, a base 43 and a flange 44 extending around the top 45 of the body 41. An upright seal area 46 may be provided to facilitate sealing of a filter to the inner surface thereof or to provide structural rigidity. A lid e.g. made of a heat sealable plastic-foil flexible laminate (see FIG. 4) may be used to seal the cup top 45 by bonding to the flange 44.

Figure 4:
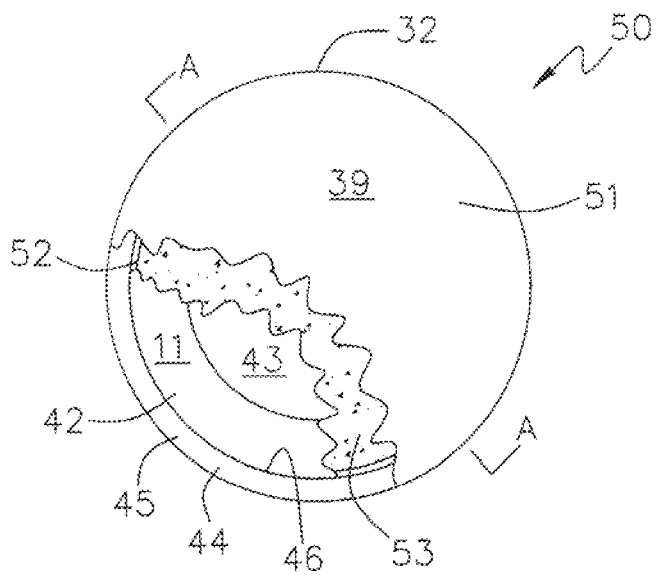
FIG. 4 illustrates a fragmentary schematic top view of a beverage filter cartridge.

Referring now to FIG. 4, a fragmentary schematic top view is depicted of a beverage filter cartridge 50. Cartridge 50 has a lid 51 formed from lid stock 32 having a top exterior surface 39 which may have various coatings, inks, printing, embossing or other decorative or informational or other functional effects applied thereto. The opposite side of the lid 51 has a surface which is affixed to the container cup 40 at the top surface 45 of cup flange 44 by means well known in the art e.g. by an adhesive or by heat sealing.

The lid may be cut or formed from any suitable oxygen and water impermeable, yieldably pierceable, and preferably heat sealable, material. In addition to metal foils such as aluminum foil, thermoplastic laminates, metallized thermoplastic films and nonmetallic polymeric films having polymeric oxygen barrier layers may be utilized for lid materials. Typically the lid 40 has less resistance to being pierced than the container cup 40, which beneficially may also be yieldably piercable. The interior surface 11 of the sheet forming the cup 40 has a sidewall 42 which tapers downward to the interior of base 43. Below the lid 51 is the interior chamber (see also FIG. 6) of the cup 40. Attached to the inner surface of the cup at the upright seal area 46 is a filter 52 in the shape of a fluted basket holding a beverage ingredient such as ground coffee 53. Container cup 40 advantageously may be made with sufficient rigidity to support the container contents during a beverage making operation which contents may include for example, the filter 52, coffee 53, and hot water filled under force (not depicted).

The filter basket 52 may be attached to either the lid 51, or preferably, to the cup 40. The filter may also be made into other shapes such as a cone or truncated cone. The material comprising the filter may be cellulosic or noncellulosic or a combination thereof. Many suitable filter papers or materials are known in the art. The filter 52 may be cut or blanked from any suitably pliable, water permeable and yieldably pierceable sheet material, a preferred example being cellulose polypropylene supplied by J. P. Crompton, Ltd. of Bury, Lancashire, England.

As shown in this figure the geometry of the cup 40 and lid 51 is circular which is a convenient shape having many known advantages in manufacture and use. It will be appreciated however that the container, cartridge, cup and/or lid may be made in various shapes including without limitation rectangular, square, cubic, rectangular prisms, cylinders, cones, pyramidal, even spherical and many variations thereof without departing from the invention.

Figure 5:
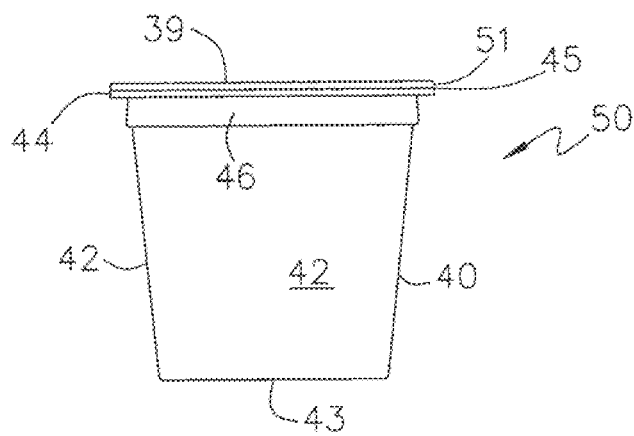
FIG. 5 illustrates a schematic side view of a cup with attached lid stock.

Referring now to FIG. 5 a schematic side view of a cartridge 50 comprising a cup 40 with attached lid 51 is illustrated. Cup 40 has a continuous sidewall portion 42 integral with a bottom portion or base 43. Opposite from the base 43 the sidewall 42 has an upright area 46 which provides on its interior surface a place for attaching a filter (see FIG. 6). The sidewall 42 tapers outward as it proceeds away from base 43 to area 46. Located distally from the base, the sidewall 42 at its upper end terminates in a flange 44 which is attached at its top surface 45 to lid 51 e.g. by heat sealing.

Figure 6:
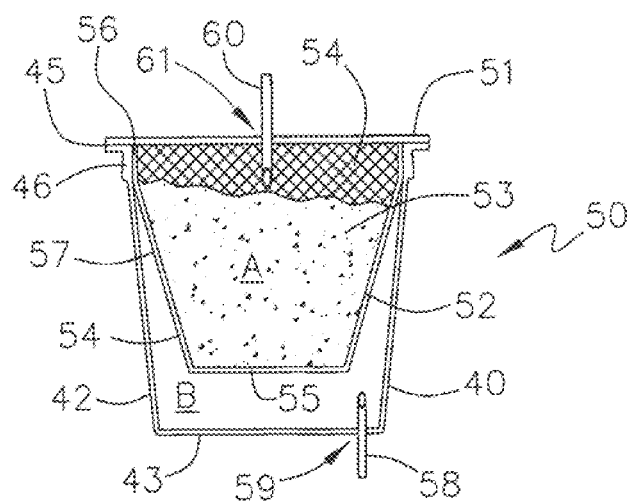
FIG. 6 illustrates a cross-sectional view taken along lines A-A' of FIG. 4 depicting a beverage filter cartridge.

Referring now to FIG. 6 a cross-sectional view taken along lines A-A' of FIG. 4 depicting a beverage filter cartridge 50 is illustrated. The beverage filter cartridge 50 includes a water and oxygen impermeable outer container or cup 40, a water permeable filter 52, and an oxygen and water impermeable lid 51.

Oxygen impermeable means the cup or container has an oxygen transmission rate ($O_2TR$) of less than 0.1 $cm^3$/cup (or container) for a 24 hour period at 1 atmosphere, 50% relative humidity, and 23° C. Preferably the cup and/or container will have an $O_2TR$ of less than 0.5 $cm^3$/cup (or container) for a 24 hour period at 1 atmosphere, 50% relative humidity, and 23° C. Beneficially, the lid or lidding material will have an oxygen transmission rate ($O_2TR$) of less than 0.5 $cm^3$/100 sq. inches for a 24 hour period at 1 atmosphere, 50% relative humidity, and 23° C. Preferably the lidding material will have an $O_2TR$ of less than 0.05 $cm^3$/100 sq. inches, (and in certain embodiments less than 0.005 $cm^3$/100 sq. inches), for a 24 hour period at 1 atmosphere, 50% relative humidity, and 23° C.

The filter 52 is formed from porous sheet material 54 shaped to conform to the interior circular shape of the upright seal area 46 and may have fluted sides to form a basket shape having a flat bottom 55 or be in any shape suitable to hold beverage ingredients 53 and for attachment to the lid or cup. The filter 52 is received in the container 40, with the filter top perimeter edge portion 56 sealed to the interior surface of cup upright area 46. The filter perimeter area 56 may have a heat sealable polymer or hot melt adhesive or other fastener means for attachment to the cup upright area 46. The filter 52 is configured, dimensioned and operatively positioned to subdivide the interior chamber of the container into first and second chamber compartments "A" and "B", When thus positioned and attached, the filter wall 57 defines a first chamber compartment "A" separate from a second chamber compartment "B", the latter defining a space onto which an outlet tube for removal of the brewed beverage. The position of an outlet tube 58 is depicted showing pierce point 59 where the cup bottom 43 is punctured. Inlet tube tube 60 is shown having pierced the lid 51 at puncture point 61.

A beverage ingredient 53, typically roasted ground coffee, is loaded into chamber compartment A, after which the lid 51 is sealed to the top flange surface 45 of the container sidewall 42 (and to any overlapping sealed edge portions of the filter 56). When thus positioned, the lid 51 overlies chamber compartment A.

During a beverage making operation or brewing cycle, as shown in FIG. 6, the cartridge 50 can be oriented vertically, and the lid 51 is pierced with one or more needle-like hollow tubes 22 to admit a liquid such as hot water under pressure into chamber compartment A for infusion with the beverage ingredient 53. The resultant beverage passes through the filter wall 57 into chamber compartment B. From here, the beverage is extracted by one or more needle-like hollow exit tubes 58 which pierce the lid and filter element at puncture point 59 through the cup bottom 43 into chamber compartment B to allow beverage removal under force of gravity or other pressure. The beverage ingredients are completely soaked because the rate of hot water being injected into the container is typically greater than the outflow rate provided by the outlet tube(s), resulting in the second chamber compartment B becoming filled with beverage extract and forcing the first chamber A to become completely filled with hot water.

Although not shown, it will be understood that the cartridge may be oriented in other ways than as illustrated in FIG. 6 before, during or after the brewing process.

Figure 7:
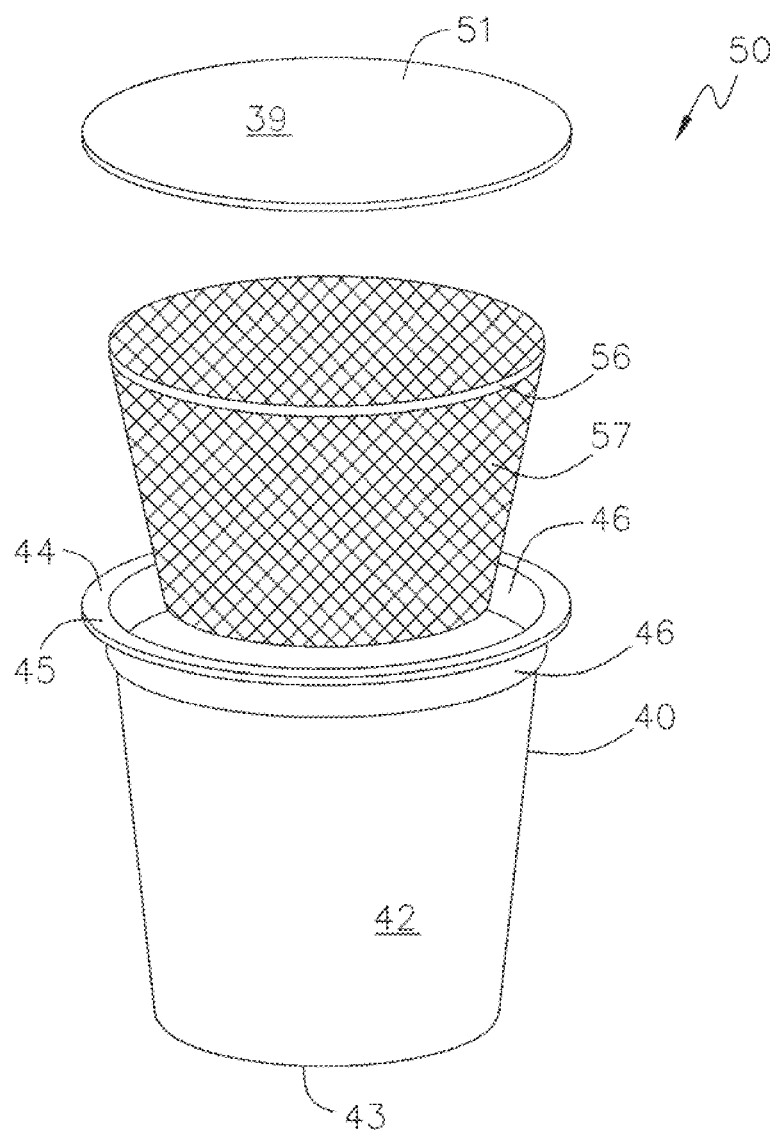
FIG. 7 illustrates an exploded perspective schematic view of the basic components of the beverage filter cartridge depicted in FIG. 4.

Referring now to FIG. 7, an exploded perspective schematic view of the basic components of the beverage filter cartridge depicted in FIG. 4 is illustrated. FIGS. 1 and 2 generally exemplify a preferred structure of the materials used to make the cup, container, lid and cartridges according to the present invention. FIGS. 1-7 all use the reference numerals which are indicative of the same or similar components or features in the various figures. Thus, the reference numerals for FIG. 7 refer to the above described features with reference to FIGS. 1-6 whose descriptions apply equally. The filter 52 may advantageously inserted into the cup 40 and heat sealed to upright area 46 by selection of a nonwoven material containing a heat sealable polymer such as polypropylene as a constituent of the nonwoven material. The filter may then be filled with a predetermined measured amount of a beverage ingredient and a lid 51 sealed to the cup. Alternatively, the filter may be prefilled with an ingredient and sealed first to the lid which is then sealed as a unit to the cup. Of course it will be apparent that dissolvable capsule with ingredients may be placed into the cup an dseled therein with the necessity of utilizing filters. These and other variations and embodiments will be apparent to those skilled in the art in view of the present disclosure and are contemplated by the present invention.

Prior art container cups, without $CaCO_3$. which were formed from oxygen and moisture impermeable heat sealable materials including e.g. polyethylene/EVOH/polystyrene have been commercially available from Curwood, Incorporated of Oshkosh, Wis., USA.

Although the outer container and lid have been described as being formed from oxygen and moisture impermeable materials, it will be understood by those skilled in the art that, alternatively, permeable materials may be employed for one or both of these components. Where permeable materials are employed, the completed cartridges will preferably be subsequently enclosed, either individually or in batches, with impermeable wrappings. Materials for such wrappings are well known, and include for example EVOH films, aluminum foil, etc.

Cartridges 50 for use in a beverage making apparatus according to the present invention include any fully enclosed packages containing the beverage making ingredient and in which $CaCO_3$ has been added to the container cup, lid and/or filter. Preferably, the $CaCO_3$ is added to at least the cup and preferably the cup and lid are substantially air and moisture impermeable.

The chamber of the cartridge contains a beverage-making ingredient. Suitable ingredients include tea (leaf or instant), coffee (ground or instant), drinking chocolate (powder or concentrate), beverage whitener (solid or liquid), or a soft drink concentrate such as a water soluble or water dispersible syrup or sweetened powder concentrate. In certain embodiments, the beverage making ingredient is an infusible beverage brewing ingredient, such as leaf tea or ground coffee. In such embodiments the cartridge may further comprise a filter sheet inside the cartridge and bonded to an internal surface of the cartridge. Typically, the amount of ingredient in the cartridge is sufficient for the preparation of one individual serving of beverage, i.e. from about 25 to about 500 milliliters (ml), preferably from about 100 ml to about 250 ml. For example, the package may contain from about 2 g to about 25 g of ground coffee or from about 1 g to about 9 g of leaf tea.

Typically, each container cup comprises a thermoplastic sheet (e.g. thermoformed or injection molded sheet) and/or flexible film material. The sheet or flexible film material will usually be a laminate comprising two or more of the following layers: a thermoplastic sealant layer for bonding the sheet to other members of the package; a substantially oxygen gas impermeable barrier layer, which preferably is a metal film such as aluminum foil for the lidding, and preferably EVOH for the cup; adhesion layers to improve adhesion between layers of the laminate; structural layers, for example to provide dimensional support to the contents of the container and a controlled puncture resistance which will advantageously resist premature puncture and spoilage, but permit controlled puncture by beverage making tubes during beverage making operations; and/or a printing substrate layer. The structural layers could be made of polyolefins, polyester, nylons, polystyrenes or other homopolymers and/or copoymers or blends thereof as is well known in the art.

In one group of embodiments, the package or processing cup or container may comprise a first sheet that has been formed, e.g. by thermoforming, into a cup or bowl shape with a flanged rim, and a second sheet that is bonded across the flanged rim to form the cartridge. For example, the first sheet may be a relatively stiff thermoplastic sheet that has been thermoformed into a generally frustoconical shape with a flanged rim, and the second sheet is a flat sheet or film, which may be of flexible film material with or without a metal foil, that is bonded across the flanged rim of the cup. Suitable embodiments are described for example in the references listed above.

The water inlet is usually one or more injection tubes, each of which may be sharpened at its tip to pierce the container or cartridge top and/or bottom. The inlet may be movable in a reciprocating motion to pierce and then retract to allow the cartridge to be removed after use.

The beverage making apparatus preferably further comprises a supply of water to the inlet, optionally for supplying water at temperatures of up to about 100° C. and pressures of about 0.1 to about 10 bar, for example from about 0.2 bar to about 2 bar, in continuous or pulsed fashion.

The apparatus may also comprise one or more outlet tubes for directing the beverage from the cartridge in the receiving station to a drinking receptacle or cup. The inlet and outlet tubes may be in the form of conduits, formed from solid or flexible material, for example tubes or channels. The tube may have a sharpened tip for piercing into the cartridge.

The materials of the cartridges described above may also be provided with a barrier coating to improve their resistance to oxygen and/or moisture and/or other contaminant ingress. The barrier coating may also improve the resistance to leakage of the beverage ingredients from within the cartridges and/or reduce the degree of leaching of extractibles from the cartridge materials which might adversely affect the beverage ingredients. The barrier coating may be of a material selected from the group of PET, Polyamide, EVOH, PVDC or a metallized material. The barrier coating may be applied by a number of mechanisms including but not limited to vapour deposition, vacuum deposition, plasma coating, co-extrusion, in-mould labelling and two/multi-stage moulding.

As used herein, the term "heat sealing" refers to sealing opposing portions of film and/or sheet with heat and pressure.

Various layers of the sheets used to make the cup or the film used to make the lid may comprises at least 50 wt % of at least one material independently selected from the following: polyethylenes, polypropylenes, ethylene/$\alpha$-olefin copolymers having at least one $C_3$ to $C_{10}$ $\alpha$-olefin, propylene/ethylene copolymers, ethylene/vinyl acetate copolymers, polystyrenes or copolymers thereof, polyamides, polyesters, polyvinyl chlorides, ionomers, and mixtures thereof. The sheet or film may further comprises one or more layers of EVOH e.g. layer(s) comprising approximately 90-100 wt % of an ethylene vinyl alcohol copolymer. Preferred EVOH copolymers have an ethylene content of about 38 mol % or between 32-44 mol %.

Preferred materials for use in fabricating the cups may be selected from multilayer, sheets capable of thermoforming. Preferred sheets and films for cups and lids may also provide a beneficial combination of one or more or all of the below noted properties including: relatively low permeability to oxygen and water vapor; high delamination resistance and an good combination of delamination resistance especially at elevated temperatures; good to excellent heat sealability; low levels of extractables with compliance with governmental regulations for food contact; does not impart off tastes or odors to brewed beverages; good tensile strength; a surface which is printable; controlled desirable puncture resistance; and good machinability.

It is preferred to use a thermoplastic film which includes an oxygen and/or moisture barrier layer. The terms "barrier," or "barrier layer" as used herein mean a layer of the multilayer film which acts as a physical barrier to moisture or oxygen molecules. Advantageous for packaging of oxygen sensitive materials such as coffee, a barrier layer material in conjunction with the other film layers will provide an oxygen gas transmission rate ($O_2$GTR) of less than 70 (preferably 45 or less, more preferably 15 or less) cc per square meter in 24 hours at one atmosphere at a temperature of 73° F. (23° C.) and 0% relative humidity. In an alternative embodiment, the gas permeability is controlled to allow the escape of $CO_2$, e.g., for packaging respiring foods such as coffee, film structures such as those described in U.S. Pat. No. 6,511,688 may be modified by annealing to remove shrink and find application in the present invention.

In certain embodiments, the multilayer film useful for lids has a film thickness of about 10 mils (254 microns) or less. Preferably, the film thickness is between about 1 and 4 mils (25.4-101.6 microns). The sheet thickness useful for a preferred embodiment of a cup made by thermoforming is preferably between about 30-50 mils (76-127 microns). Such sheet thicknesses provide good part performance, excellent drawability and an excellent combination of packaging and processing performance. Sheets thinner than 10 mils may lack sufficient sidewall rigidity for certain intended uses. For cups used in brewing operations and packaging processes e.g. such as those utilized in Keurig—style brewers, advantageously the sheets used to thermoform into cups are at least 25 mils thick.

In a preferred embodiment the multilayer film useful for the inventive cup has at least six layers. These six layers are termed the first layer, the second layer, the third layer, the fourth layer, the fifth layer and the sixth layer. The first layer and fifth layer are disposed on opposing sides of the third layer and are preferably attached thereto by the second and fourth layers, respectively and the third layer is an oxygen barrier layer. The sixth layer is a thermoforming layer and provides a material that facilitates good drawability to the desired depths needed to produce commercially acceptable beverage cartridges. A preferred material for thermoformability is polystyrene. Polystyrene and its copolymers desirably have excellent thermoformiong properties and also have excellent heat stability which is necessary for contact with hot liquids such as hot water for brewing coffee.

It is contemplated that sheets or films having more than five layers may also be constructed and that such additional layers may be disposed as additional intermediate layers lying between the third layer (also called the core or barrier layer) and either or both of the first and fifth layers, or these additional layers may comprise one or more surface layers and comprise either or both the interior or exterior surface of the sheet or be at other points in the structure.

Typical layer thicknesses for a ten layer thermoformable sheet for making a cup may be about 2% first (typically interior surface) layer, 2% second structural layer, 1% third (tie, binding layer), 0.5% fourth (oxygen barrier) layer, 1% fifth (tie, binding) layer, 2% sixth (structural) layer, 2% seventh (thermal bonding) layer, 10% eighth layer, 69.5% ninth (thermoforming) layer, 10% tenth (skin) layer. The 8-10$^{th}$ layers also provide excellent drawability in thermoforming operations and heat resistance during brewing operations. Films with differing layer ratio thicknesses are contemplated and may be varied without undue experimentation Also, in other embodiments, fewer or more film layers may be present and a structure for a cup and/or lid having e.g. 3, 4, 5, 6, 7, 8, 9, 10, 11 or more layers may be produced e.g. by altering the typical layer thicknesses.

In certain embodiments, various layers may further comprise about 0.1-10 wt %, preferably about 3-5 wt %, of a polymeric additives such as antiblocking agents or slip additives or other processing aides.

The polyethylenes and ethylene alpha-olefin copolymer materials described herein have at least 50% of their polymeric units derived from polymerization of ethylene monomer whereas the polypropylene or propylene ethylene copolymers have at least 50% of their polymeric units derived from propylene monomer.

A barrier layer present between the inner and outer surface layers may comprise at least one material independently selected from group consisting of: ethylene vinyl alcohol copolymers (EVOH), polyacrylonitriles, polyamides, vinylidene chloride copolymers (PVDC), polyglycolide copolymers, and mixtures thereof. The barrier layer functions as a controlled gas barrier, and provides the necessary oxygen barrier for preservation of the article to be packaged. It is desirable that the thickness of the barrier layer be greater than about 0.05 mil (1.27 microns) and less than about 0.80 mil (20.3 microns) to provide the desired combination of the performance properties sought, e.g. with respect to oxygen permeability, and delamination resistance. In certain embodiments, the suitable thickness of the barrier layer is less than about 15%, typically about 1-13% of the total sheet thickness. In certain embodiments, the barrier layer comprises: at least about 90 wt %, preferably about 100 wt %, of an ethylene vinyl alcohol (EVOH) copolymer resin having an ethylene content of about 32-44 mol %.

EXAMPLES

Experimental results and reported properties of the following examples and comparative examples are based on the following test methods or substantially similar methods, unless otherwise noted:

Density: ASTM D-792
Tensile Strength: ASTM D-882, Method A
Oxygen Gas Transmission Rate ($O_2$GTR): ASTM D-3985-81
Water Vapor Transmission Rate (WVTR): ASTM F 1249-90
Melt Index: ASTM D-1238, Condition E (190° C./2.16 kg) unless indicated otherwise herein e.g. propene-based (>50% $C_3$ content) polymers tested at Condition TL (230° C.); polystyrene polymers were tested at 200° C.; 5 kg)
Melting point: ASTM D-3418, DSC with 5° C./min heating rate
Vicat Softening Temperature: ASTM D-1525

Following are comparative examples and examples given to illustrate embodiments of the invention. All percentages are by weight unless indicated otherwise. All averages are mean unless indicated otherwise.

Examples 1-10

Example 1 is a comparative example (not of the invention) and examples 2-10 are of the invention with examples 8-10 being illustrative hypotheticals. The following comparative example 1 is a prior art rigid single serve, disposable cup suitable for processing beverages therein such as those used in making a filter cartridge for brewing coffee in a Keurig-style coffee brewer. Examples 2-10 are of the invention and illustrate improvements afforded by preferred embodiments of the invention relative to this comparative example. The cups are made by thermally laminating together a seven layer blown film after slitting the tube to make a sheet with a three layer cast sheet by means known in the art to produce a ten layer sheet suitable for thermoforming by known techniques and equipment into a flanged cup.

The seven layer film may be made using conventional blown film equipment and procedures known in the art to produce the structure related below. The layers are all coextruded through a multilayer die to form a seven layer structure having a thickness of about 4 mil (107 microns (μ)). The layers are presented in adjacent numerical order with the first and seventh layers being the inner and outer surface layers of the blown tubular film. The first through seventh layers have the compositions indicated in Table 1 with the weight percentages given for the blend components of each layer. For all examples the materials used were as follows unless otherwise indicated. For examples 1-7, the resins for each film layer were coextruded at a first, second, third, fourth, fifth, sixth, and seventh layer outlet mass ratio of about 16.2:16.0:7.3:15.7:7.3:15.5:22.0.

Layer formulations of Examples 1-10 are reported below in Table 1.

TABLE 1

| Ex. # | First Inner Heat Seal Layer | Second Structure Layer | 3rd & 5th Tie Layer | Fourth Barrier Layer | Sixth Struct. Layer | Seventh Thermal Bonding Layer | 8th & 10th Skin Layer | Ninth Core Layer |
|---|---|---|---|---|---|---|---|---|
| 1 | 70.6% LDPE 25% EAO 4.4% PE additive | 98% LDPE 2% slip additive | 100% Bynel | 100% EVOH | 100% EVA | 100% K Resin | 88.5% HIPS 9% PS 2.5% Color conc. | 0.0% $CaCO_3$ 71% HIPS 25% PS 4% Color con. |
| 2 | Same as Ex. 1 | Same as Ex. 1 | Same as Ex. 1 | Same as Ex. 1 | Same as Ex. 1 | Same as Ex. 1 | Same as Ex. 1 | 5.0% $CaCO_3$ 78.7% HIPS 13.8% PS 2.4% Color con. |
| 3 | Same as Ex. 1 | Same as Ex. 1 | Same as Ex. 1 | Same as Ex. 1 | Same as Ex. 1 | Same as Ex. 1 | Same as Ex. 1 | 10.0% $CaCO_3$ 73.8% HIPS 13.8% PS 2.4% Color con. |
| 4 | Same as Ex. 1 | Same as Ex. 1 | Same as Ex. 1 | Same as Ex. 1 | Same as Ex. 1 | Same as Ex. 1 | Same as Ex. 1 | 15.0% $CaCO_3$ 68.7% HIPS 13.8% PS 2.4% Color con. |
| 5 | Same as Ex. 1 | Same as Ex. 1 | Same as Ex. 1 | Same as Ex. 1 | Same as Ex. 1 | Same as Ex. 1 | Same as Ex. 1 | 20.0% $CaCO_3$ 63.8% HIPS 13.8% PS 2.4% Color con. |
| 6 | Same as Ex. 1 | Same as Ex. 1 | Same as Ex. 1 | Same as Ex. 1 | Same as Ex. 1 | Same as Ex. 1 | Same as Ex. 1 | 5.0% $CaCO_3$ 78.7% HIPS 13.8% PS 2.4% Color con. |
| 7 | Same as Ex. 1 | Same as Ex. 1 | Same as Ex. 1 | Same as Ex. 1 | Same as Ex. 1 | Same as Ex. 1 | Same as Ex. 1 | 15.0% $CaCO_3$ 68.7% HIPS 13.8% PS 2.4% Color con. |

TABLE 1-continued

| Ex. # | First Inner Heat Seal Layer | Second Structure Layer | 3rd & 5th Tie Layer | Fourth Barrier Layer | Sixth Struct. Layer | Seventh Thermal Bonding Layer | 8th & 10th Skin Layer | Ninth Core Layer |
|---|---|---|---|---|---|---|---|---|
| 8 | 5% CaCO$_3$<br>70.6% LDPE<br>20% EAO<br>4.4% PE additive | 15% CaCO$_3$<br>83% LDPE<br>2% slip additive | Same as Ex. 1 | Same as Ex. 1 | Same as Ex. 1 | Same as Ex. 1 | Same as Ex. 1 | 20.0% CaCO$_3$<br>63.8% HIPS<br>13.8% PS<br>2.4% Color con. |
| 9 | 70.6% LDPE<br>25% EAO<br>4.4% PE additive | 15% CaCO$_3$<br>83% LDPE<br>2% slip additive | Same as Ex. 1 | Same as Ex. 1 | Same as Ex. 1 | Same as Ex. 1 | Same as Ex. 1 | 20.0% CaCO$_3$<br>63.8% HIPS<br>13.8% PS<br>2.4% Color con. |
| 10 | 70.6% LDPE<br>25% EAO<br>4.4% PE additive | 20% CaCO$_3$<br>78% LDPE<br>2% slip additive | 20% CaCO$_3$<br>80% Bynel | Same as Ex. 1 | Same as Ex. 1 | Same as Ex. 1 | Same as Ex. 1 | 20.0% CaCO$_3$<br>63.8% HIPS<br>13.8% PS<br>2.4% Color con. |

The low density polyethylene (LDPE) and linear low density polyethylene (LLDPE) used were commercially available polyethylenes sold by The Dow Chemical Company of Midland, Mich., USA under the trade names of LDPE 608A and Dowlex™ 2645G, respectively. The LDPE had a density of about 0.923 g/cm$^3$, and a melt index of about 2.6 dg/min. (190° C./2.16 kg), a Vicat softening point of about 97.2° C., and a melting point of about 113° C. The LLDPE was an ethylene octene-1 copolymer having a density of about 0.919 g/cm$^3$ and a melt index of about 0.90 dg/min., a Vicat Softening Point of about 107° C., and a melting point of about 120° C. For the first layer of the seven layer film, the 4.4 weight percent of PE additives were similar blends of conventional additives including anti-block, slip and processing aids in polyethylene carrier resins. The slip additive of the second and sixth layers was a 5 wt. % erucamide slip agent in a polyethylene carrier resin. The tie layers were 100% adhesive resins and the same anhydride-modified LLDPE adhesive was used in all examples. Commercially available adhesive polymeric resins are available from a variety of suppliers and include for example various modified polyolefins such as the anhydride-modified polyethylenes sold under the Bynel trademark by the DuPont Packaging and Industrial Polymers division of E.I. Du Pont de Nemours and Company, Inc. A suitable adhesive resin is Bynel 41E687 anhydride-modified LLDPE having anominal density of 0.91 g/cc and melt flow rate of 1.7 g/10 minutes, melting point of 119° C. A variety of ethylene vinyl alcohol copolymers are suitable and may be used in the present invention. The examples for comparison used the same EVOH resin from Soarus ILC of Japan sold under the trademark SOARNOL® ET 3803. This EVOH copolymer has an ethylene content of about 38 mol %, a density of 1.14 g/cc, a melt index of 3.2 dg/min (at 210° C./2.16 kg), and a melting point of about 173° C. and an oxygen permeability of about 0.7 cc mil/100 square inches day 1 atmosphere at 20° C. and 65% relative humidity (0.7 cc 20 µ/m$^2$ day one atmosphere at at 20° C. and 65% relative humidity). The sixth layer of the examples utilized ethylene and vinyl acetate (EVA). Suitable ethylene and vinyl acetates are available from many suppliers including E.I. du Pont de Nemours and Company, Inc. In the examples an EVA from Exxon Mobil Corporation, Houston, Tex., USA under the trade name Escorene Ultra EVA LD.705.MJ was used. This EVA has a 12.8% vinyl acetate content, a density of 0.935 g/cm$^3$, a melt index of 0.4 dg/min, and a melting point of 93° C.).

The seventh layer of each of the examples used a styrene butadiene copolymer (SBC) sold by Chevron Phillips Chemical Company LP, The Woodlands, Tex., USA under the trademark K-Resin grade DK13. This polymer has the following reported properties: 1.02 g/cc density; 10.0 g/10 minutes melt flow rate at 200° C./5 Kg; 5.4 gram mil/100 sq. Inch 24 hours Moisture vapor transmission rate (MVTR); 293 cc mil/100 sq. inch per 24 hours oxygen transmission rate. This material was chosen to form a good thermal lamination bond to the cast sheet described below. The seven layer tubular film was slit and wound on a roll and subsequently thermally laminated to an approximately 30 mil (762µ) thick cast sheet (as described below) by conventional means e.g. by unwinding the rolls of film and sheet and bringing them into surface to surface contact under elevated temperatures and pressures and passing the film and sheet through at least one set of nip rolls followed by thermal quenching or lowering of the laminated sheet temperatures to produce a thermoformable sheet suitable for cutting and thermoforming into cups.

The three layer cast sheet was composed and its layers are presented in adjacent numerical order with the three layers denoted the eighth, ninth and tenth layers with the eighth and tenth layers being the surface layers of the three layer sheet. These three layers have the compositions indicated in Table 1 with the weight percentages given for the blend components of each layer. For all examples the materials used were as follows unless otherwise indicated. For examples 1-5, the resins for each sheet layer were coextruded at an eighth, ninth, and tenth layer outlet mass ratio of about 10:80:10. For examples 6 and 7 these mass ratios are 9.8:80.3:9.9 and 9.4:81.3:9.3, respectively.

The same high impact polystyrene (HIPS) was used for all of the examples. A suitable HIPS is commercially available from a variety of suppliers and for the examples HIPS sold under the trademark Atofina 945E by Total Petrochemicals, Inc. was used. This HIPS had a density of 1.04 g/cm$^3$, a 97.8° C. Vicat Softening Point $V_{sp}$, and a melt index of 3.5 dg/min. (at 200° C.; 5 kg). The crystalline polystyrene used was Fina 524 GPPS from the same supplier and had a density of 1.04 g/cm$^3$, a 100.5° C. Vicat Softening Point $V_{sp}$, and a melt index of 9 dg/min. The color concentrates used in the examples were alike having titanium dioxide in a high impact polystyrene carrier resin. It will be appreciated that various colors may be utilized in the present invention.

The calcium carbonate ($CaCO_3$) was blended into the indicated layers by conventional blending means from a pelletized concentrate having 75 wt. % of $CaCO_3$ in a polystyrene carrier resin. This material is commercially available from Heritage Plastic of Picayune, Miss., USA and has melt index of about 1 (between 0.1 and 2) dg/min., a density of about 1.9 g/cm³. The concentrate was diluted with high impact polystyrene to yield the desired concentrations described in Table 1.

The resins for each film or sheet layer were blends of the materials and amounts indicated above and in Table 1. For each layer, the resin or resin mixture is fed from a hopper into an attached extruder where the resin and/or resin mixture is heat plastified and extruded through a die into a blown film or cast sheet respectively. Conventional process equipment may be used and parameters may be varied in accordance with the particular equipment and materials chosen in view of the present invention.

After thermal lamination of the sheet to the film cups were similarly made by conventional thermoforming and the formed cups were subjected to a variety of tests. For examples 1-5 where equal weights were targeted for each cup, allowing the thickness to vary accordingly, the resins for each film layer were extruded at a calculated outlet mass ratio for first, second, third, fourth, fifth, sixth, seventh, eight, ninth and tenth layers of: 1.4:1.3:0.6:1.3:0.6:1.3:1.8:9.2:73.3:9.2. Examples 1-7 also have the composition and physical properties, shown below in Table 2.

The above cups were also subjected to brew tests using two different models of beverage brewing machines denoted "A" and "B". The brew tests were performed by heat sealing a foil polymer laminate lid to each cup using a tray sealer under the following conditions: temperature=300° F.; pressure=50 psi; and dwell time=2.5 seconds. The sealed test cup with lid is inserted into the indicated brewing machine and after the brewing operation is complete, the cup is removed from the holder and the cup sidewall and bottom is inspected for creases, buckles and other defects. This test was repeated using 26 samples of each Example and the percentage failures reported. The cup bottom puncture should exhibit a smooth and continuous hole. Difficult to puncture cups may buckle at the sidewall or form a crease at the cup bottom extending from the puncture hole to the sidewall. These visible sidewall deformations or bottom creases are denoted as cup failures and the percentage reported. The brewing machine puncture tube may be adapted to provide a strenuous test that may replicate conditions where worn or poorly maintained piercing tubes are found. Table 3 below shows the test results for Examples 1-7.

The cups of examples 1-7 were also subjected to Puncture force tests and creases resulting from these tests were also determined. The Puncture Force Test used a Chatillion Tensile tester Model CM0104 equipped with a standard hollow needle such as those used in commercial Keurig-style coffee beverage brewing machines to puncture the bottom of a bev-

TABLE 2

| Ex. # | $CaCO_3$ in Cup % | Cup weight grams | sheet laminate thickness mil (μ) | sheet laminate density (ρ) | Cup bottom thickness mil (μ) | Cup sidewall thickness mil (μ) | Inside Diameter inches (cm) | Concentricity inches ×10⁻³ |
|---|---|---|---|---|---|---|---|---|
| 1 | 0 | 2.46 | 41.3 | 1.03 | 11.6 (295) | 12.6 | 1.745 | 10.3 |
| 2 | 3.5 | 2.47 | 41 | 1.05 | 11.9 | 11.1 | 1.746 | 9.5 |
| 3 | 6.9 | 2.49 | 40.8 | 1.07 | 12.2 | 10.8 | 1.747 | 8.4 |
| 4 | 10.3 | 2.58 | 40.5 | 1.11 | 12.5 | 10.9 | 1.746 | 9.1 |
| 5 | 13.7 | 2.48 | 38.5 | 1.11 | 12.9 | 9.72 | 1.750* | 10.8 |
| 6 | 3.5 | 2.51 | 41.3 | 1.07 | 11.6 | 12 | 1.744 | 8.5 |
| 7 | 10.4 | 2.69 | 42 | 1.11 | 11.8 | 11 | 1.742 | 8.9 |

*Maximum measurable value is 1.750 inches; this average value is an estimate.

The results from Table 2 shows the amount of calcium carbonate added in the total weight of the cup, cup weight in grams, sheet laminate density, the average thickness of the ten layer laminate of the cups from which the cups of the first seven examples are thermoformed as well as average values for the indicated thicknesses. The inside diameter was measured at the upright area adjacent the flange. Concentricity is a measurement indicative of the centering of the formed cup interior with respect to the flange exterior perimeter. The indicated measurement is the distance that is the maximum deviation from true concentricity. As will be shown below, surprizingly the cups with the thinnest side walls and thickest bottoms performed the best with respect to puncture and brew tests while maintaining comparable burst strengths as seen in the compression tests below.

The above cups were subjected to compression testing. The compression test was used to determine the burst strength of a sealed package using the Com-Ten Industries Compression Tester. A dozen samples of each cup were individually tested by placing each sample between the test equipment platens which moved at a rate of 2 inches per minute to compress the sample and the peak force was recorded. The average, standard deviation (σ), and minimum and maximum values of each set are reported in Table 3 below.

erage cartridge cup. The cup was inverted, bottom up, on the lower platen of the tester and the upper test head equipped with the needle which was positioned adjacent to the bottom surface (~1 mil from surface) and the needle was lowered at a rate of 5 inches per minute with the force required to puncture recorded. The needle was withdrawn and any visible creases noted. A Baker's dozen (13) of cups were tested for each example and the mean average puncture force required to puncture with the minimum and maximum sample forces reported. Table 3 below shows the test results for Examples 1-7.

TABLE 3

| Ex. # | Compression avg. lbs σ = standard deviation (Min.-Max) | Brew Test A % Failure | Brew Test B % Failure | Puncture Force avg. lbs (Min.-Max) | Bottom Crease % |
|---|---|---|---|---|---|
| 1 | 62 σ = 6.4 (49-73) | 53.8 | 69.2 | 3.7 (3.4-4.1) | 62 |

TABLE 3-continued

| Ex. # | Compression avg. lbs σ = standard deviation (Min.-Max) | Brew Test A % Failure | Brew Test B % Failure | Puncture Force avg. lbs (Min.-Max) | Bottom Crease % |
|---|---|---|---|---|---|
| 2 | 57 σ = 6.0 (49-72) | 46.2 | 57.7 | 3.3 (2.9-3.6) | 46 |
| 3 | 55 σ = 5.0 (49-66) | 3.8 | 38.5 | 3.3 (2.7-3.7) | 38 |
| 4 | 64 σ = 8.8 (50-77) | 0.0 | 15.4 | 3.5 (3.2-3.9) | 0 |
| 5 | 61 σ = 6.5 (49-69) | 0.0 | 15.4 | 3.6 (3.3-3.8) | 0 |
| 6 | 56 σ = 4.7 (49-64) | 23.1 | 73.1 | 3.4 (3.0-3.7) | 38 |
| 7 | 56 σ = 6.1 (47-66) | 15.4 | 80.8 | 3.1 (2.7-3.5) | 31 |

The results in Table 3 demonstrate that addition of $CaCO_3$ has no detrimental effect upon the required burst strength of the cup while it greatly improves the ability to pierce the cup bottom with greatly improved reductions in failure rates due to undesirable deformations and creases. The brew tests demonstrate that cups of the invention will be less susceptible to leakage and cracking. Improvements in maintaining the integrity of the cup, container and cartridge are demonstrated.

Referring now to Examples 8-10, examples of constructions having $CaCO_3$ incorporated into other layers are exemplified. Advantageously, blending $CaCO_3$ into one or more of these other layers is believed to contribute to amelioration of the rigidity and puncture problems already mentioned, but it is also has the added benefit of providing carbon dioxide scavenging functionality to the cup. The first layer being frequently used as a heat sealing layer may advantageously be kept free of calcium carbonate so as to not lessen the sealability yet the nature of the polymers selected is such that a gas such as carbon dioxide may diffuse across the first layer and be absorbed by or react with the calcium carbonate contained in intermediate layers such as layers 2 and 3 to avoid or lessen, or defer pressurization of the container contents thereby reducing packaging times and/or increasing shelf life, stability of the product or improving the organoleptic properties of ingredients held within the container by prevention, diminution, or delaying oxidative reactions by facilitating earlier packing of e.g. coffee with a less post-roasting hold times.

Thus, it is seen by the above description that calcium carbonate may be added using various structures, blends and material thicknesses to improve various problems associated with single serve or single serve containers such as processing cups for beverage making apparatus e.g. coffee and other hot beverage brewing machines while maintaining physical properties such as oxygen barrier, thermoformability, machinability, heat sealability, printability and other requirements of fitness for use. Other benefits of the invention include reducing the required volume of material and the amount of petrochemicals needed while improving functionality of the cup. The inventive blend formulations are believed to also improve process speeds and reduce extruder and oven temperatures by increasing the heat transfer rate of the material. The inventive cups also should perform better in Keurig brewers as shown by the improved puncture and brew test results. The great improvement in ease of puncturing may have the added benefit of extending the needle tube life in the brewer.

The calcium carbonate is also believed to reduce shrinkage in thermoforming resulting in less waste and increased ease in maintaining very tight dimensional size specifications needed for small single serve processing cup.

The cup may have other applications apart from acting as a beverage ingredient container or processing cup e.g. to hold foodstuffs such as dairy cream or coffee whiteners, fats, oils, small portions of condiments, honey, or solid, or liquid chemicals or industrial products such as epoxies, paints, etc.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention. It is therefore intended that the foregoing detailed description be regarded as illustrative rather than limiting, and that it be understood that it is the following claims, including all equivalents, that are intended to define the spirit and scope of this invention.

What is claimed is:

1. A single use processing cup for brewing beverages comprising:
a unitary molded multilayer thermoplastic polymeric cup defined by a continuous sidewall portion integral with a bottom portion and having an interior surface layer, an exterior surface layer and at least one intermediate layer, said cup having a top opening defined by a continuous perimeter flange integral with an upper edge portion of said continuous sidewall and located distally from said bottom portion; wherein said cup is formed from polymeric materials comprising a seven layer blown film laminated to a three layer cast sheet; wherein said blown film comprises, in sequential order, a first layer of polyethylene, a second layer of polyethylene, a third layer of anhydride modified polyethylene, a fourth layer of ethylene vinyl alcohol copolymer, a fifth layer of anhydride modified polyethylene, a sixth layer of ethylene vinyl acetate copolymer, a seventh layer of polystyrene; wherein at least one layer of the three layer cast sheet comprises a high impact polystyrene, a styrenic homopolymer or copolymer, or blends thereof and having from 20 to 50% by weight of calcium carbonate incorporated therein based upon the total weight of the at least one layer of the three layer cast sheet;
wherein the incorporation of calcium carbonate in the polymeric material provides an average puncture force required to pierce the bottom of the cup less than required for a cup made from the same polymeric material without the calcium carbonate.

2. A cup, as defined in claim 1, wherein said cup further comprises a lid covering said cup opening and forming an enclosed chamber therein by attachment of said lid to said flange or to a cup area adjacent said flange and thereby forming a cartridge.

3. A cup, as defined in claim 2, further comprising a filter sheet having a perimeter area attached to at least one of said cup and said lid to separate said chamber into a first compartment proximate said lid and a second compartment proximate said cup bottom and thereby forming a filter cartridge.

4. A cup, as defined in claim 3, wherein said cup further comprises a beverage ingredient disposed with said first compartment.

5. A cup, as defined in claim 4, wherein said beverage ingredient emits carbon dioxide gas.

6. A cup, as defined in claim 3, wherein said filter sheet is attached to an area of said cup proximate said flange.

7. A cup, as defined in claim 3, wherein said filter sheet is attached to an area of said lid proximate said flange.

8. A cup, as defined in claim 3, wherein said filter sheet is in the shape of a fluted basket or a truncated cone.

9. A cup, as defined in claim 3, wherein said filter sheet comprises a nonwoven polymeric material having incorporated therein $CaCO_3$.

10. A cup, as defined in claim 3, wherein said cup further comprises coffee, tea or cocoa, disposed within said first compartment.

11. A cup, as defined in claim 3, wherein said cup further comprises roasted and ground coffee.

12. A cup, as defined in claim 2, wherein said lid comprises a polymeric film having $CaCO_3$ in a surface layer disposed proximate a chamber formed by said cup and lid.

13. A cup, as defined in claim 12, wherein said $CaCO_3$ incorporated into said lid an amount of at least 10% by weight based upon the polymeric components of said lid.

14. A cup, as defined in claim 2, wherein said cup and lid are attached to form a hermetic seal.

15. A cup, as defined in claim 2, wherein said lid comprises a metal foil laminated to a heat sealable polymeric layer.

16. A cup, as defined in claim 2, wherein said lid comprises a polymeric multilayer film having an oxygen barrier of 0.5 $cm^3$/100 square inches for a 24 hour period at 1 atmosphere, 50% relative humidity, and 23° C.

17. A cup, as defined in claim 2, wherein said lid comprises at least three polymeric layers with EVOH as an intermediate layer.

18. A cup, as defined in claim 2, wherein said lid comprises a metallized noncellulosic polymer.

19. A cup, as defined in claim 2, wherein said lid comprises a metallized polypropylene or polyester.

20. A beverage filter cartridge comprising: a cup as defined in claim 1, a filter, a lid and at least one beverage ingredient, wherein said cup and lid are sealed together to form an interior chamber which is separated into a first compartment and a second compartment by said filter, said ingredient is contained within said first compartment, and wherein at least one of said cup, lid and filter contains calcium carbonate.

21. A beverage filter cartridge as defined in claim 20, wherein said cup has an oxygen transmission rate of less than 0.1 $cm^3$/cup for a 24 hour period at 1 atmosphere, 50% relative humidity, and 23° C.

22. A cup, as defined in claim 1, wherein said CaCO3 is present in an amount of between 30 to 50% by weight.

23. A cup, as defined in claim 1, wherein said cup has an oxygen transmission rate of less than 0.05 cm3/cup for a 24 hour period at 1 atmosphere, 50% relative humidity, and 23° C.

24. A cup, as defined in claim 1, wherein said polymeric materials include polystyrene homopolymer, high impact polystyrene, or a styrene butadiene copolymer.

25. A cup, as defined in claim 1, wherein said polymeric materials include EVOH or polyglycolic acid.

26. A cup, as defined in claim 1, wherein said polymeric materials include polyolefinic homopolymers or copolymers, polyethylene, polypropylene, or blends thereof.

27. A cup, as defined in claim 1, wherein said styrenic homopolymer or copolymer is polystyrene or styrene butadiene copolymer or blends thereof.

28. A cup, as defined in claim 1, wherein said cup is formed by thermoforming.

\* \* \* \* \*

UNITED STATES PATENT AND TRADEMARK OFFICE
CERTIFICATE OF CORRECTION

| | | |
|---|---|---|
| PATENT NO. | : 8,474,368 B2 | Page 1 of 1 |
| APPLICATION NO. | : 12/465199 | |
| DATED | : July 2, 2013 | |
| INVENTOR(S) | : Stephen Mark Kilber et al. | |

It is certified that error appears in the above-identified patent and that said Letters Patent is hereby corrected as shown below:

In The Specification

In column 4, line 31, delete "properties" and insert -- properties. --, therefor.

In column 4, line 39, delete "the" and insert -- The --, therefor.

In column 5, lines 1-2, delete "transmisson" and insert -- transmission --, therefor.

In column 5, line 3, delete "admissiom" and insert -- admission --, therefor.

In column 8, line 51, delete "(LLDPE)." and insert -- (ULDPE). --, therefor.

In column 9, lines 60-61, delete "dimesional" and insert -- dimensional --, therefor.

In column 11, lines 13-14, delete "othe rlater smay" and insert -- other layers may --, therefor.

In column 11, line 61, delete "piercable." and insert -- pierceable. --, therefor.

In column 13, line 4, delete "tube tube" and insert -- tube --, therefor.

In column 13, line 51, delete "an dseled" and insert -- and sealed --, therefor.

In column 13, line 56, delete "$CaCO_3$." and insert -- $CaCO_3$ --, therefor.

In column 14, line 44, delete "copoymers" and insert -- copolymers --, therefor.

In column 16, line 23, delete "thermoformiong" and insert -- thermoforming --, therefor.

In column 19, line 50, delete "anominal" and insert -- a nominal --, therefor.

In column 19, line 54, delete "ILC" and insert -- LLC --, therefor.

In column 19, line 61, delete "at at" and insert -- at --, therefor.

In column 22, line 25, delete "Chatillion" and insert -- Chatillon --, therefor.

In The Claims

In column 25, line 20, in claim 13, delete "$CaCO_3$" and insert -- $CaCO_3$ is --, therefor.

Signed and Sealed this
Twenty-ninth Day of September, 2015

Michelle K. Lee
*Director of the United States Patent and Trademark Office*